Jan. 30, 1951     W. RAMMINGER     2,539,927
ANTIGLARE HEADLIGHT
Filed Oct. 30, 1948
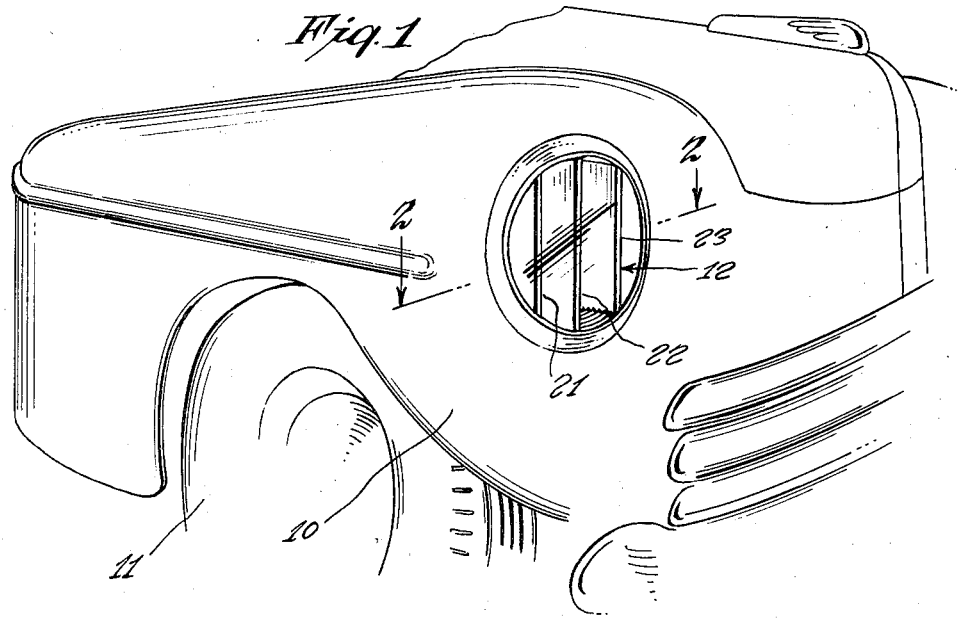
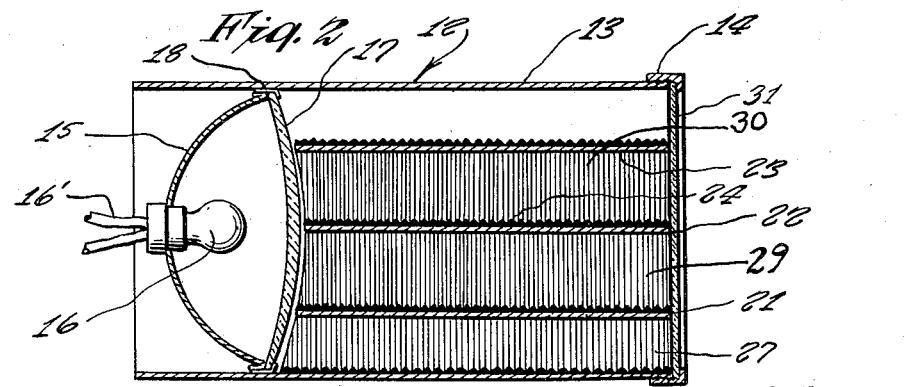
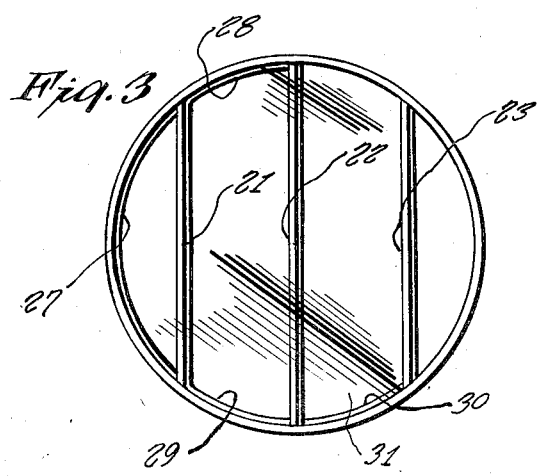
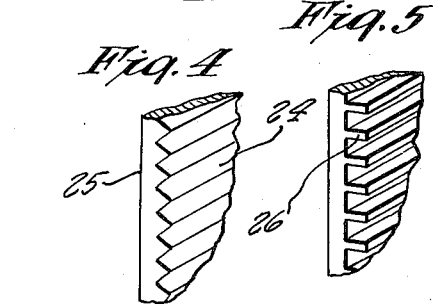
INVENTOR.
WILLIAM RAMMINGER
BY
Carl Miller
ATTORNEY Patented Jan. 30, 1951

2,539,927

UNITED STATES PATENT OFFICE 2,539,927

ANTIGLARE HEADLIGHT

William Ramminger, Brooklyn, N. Y.

Application October 30, 1948, Serial No. 57,539

1 Claim. (Cl. 240—46.31)

This invention relates to an anti-glare headlight for automobiles.

It is an object of the present invention to provide an anti-glare headlight which will prevent the light rays from striking the left side of the road, therefore, will not hinder an oncoming driver and which, at the same time, will not reduce the normal volume of light on the road for the car having the anti-glare headlights.

Other objects of the present invention are to provide an anti-glare headlight comprising a cylindrical tube with light ray controlling reflectors and absorbers to shield and control the rays of light, which is of simple construction, inexpensive to manufacture, easily installed in the forward end of the automobile, has no moving parts, and efficient in operation.

For other objects and for a better understanding of the invention, reference may be had to the following detailed description taken in connection with the accompanying drawing, in which:

Fig. 1 is a perspective view of the forward end of an automobile having the anti-glare headlight of the present invention installed therein.

Fig. 2 is a longitudinal sectional view of the anti-glare headlight as viewed on line 2—2 of Fig. 1.

Fig. 3 is an end elevational view of the headlight.

Figs. 4 and 5 are respectively fragmentary views of reflecting and absorbing materials used in the headlight, the respective fragments differing from one another by the contour of exterior surfaces.

Referring now to the figures, 10 represents the forward end of an automobile extending over a wheel 11 and having a forward central opening therein in which is installed my anti-glare headlight, indicated generally at 12. There will be two of these headlights on the forward end of the automobile, the same as with the ordinary lighting systems.

The headlight 12 comprises a cylindrical hollow tube 13 open at the opposite ends and reinforced at its forward end by a ring 14. In its rear end is a head lamp comprising a reflector 15 having a bulb or light source 16 in the center thereof to which is lead electric current through cables 16'. Secured to the reflector 15 is a lens 17. A clamping ring or fastener 18 holds the lens 17 in place on the reflector.

Extending vertically and at laterally spaced locations within the cylindrical tube 13 are partitions 21, 22 and 23. Each partition comprises of an irregular light absorbing surface 24, Fig. 4, and a light reflecting or smooth surface 25. These partitions can also be constructed as shown in Fig. 5, wherein squared flutes 26 are used on the light absorbing surface instead of the V-shaped flutes 24 shown in Fig. 4. The light-absorbing flutes are formed of dull black material whereas the light-reflecting surfaces are made of preferably white gloss or polished light-reflecting material. Each partition may be formed of separate parts or can be constructed of integral pieces having light-absorbing and light-reflecting portions.

The cylindrical wall of the tube 13 is partly provided with light-absorbing materials or surfaces of flutes running parallel to the flutes on the partitions. These flutes are indicated at 27, 28, 29 and 30, and lie only on the interior wall of the cylindrical tube. A clear glass 31 is secured in front of the usual opening in the anti-glare headlight which of course keeps dust and dirt from entering the interior thereof. The arrangement is such as to shield off or absorb, and reflect the rays of light as they pass through the partitions in the cylindrical tube, in such a manner that all absorbing surfaces of the anti-glare headlight will prevent the light rays from striking the left hand side of the road, and all light reflecting surfaces will reflect the light to the right hand side of the road leaving the main central beam, whether upper or lower beam of the headlight shine through undisturbed, and therefore, will not reduce the normal volume of light on the road ahead.

While various changes may be made in the detail construction, it shall be understood that such changes shall be within the spirit and scope of the present invention as defined in the appended claim.

Having thus set forth and disclosed the nature of my invention, what is claimed is:

An anti-glare headlight arrangement comprising a cylindrical hollow shell or tube, a light reflector in the rear end of said tube having a lamp bulb therein, a lens disposed in the tube ahead of the reflector, and a plurality of vertically extending laterally spaced parallel partitions disposed in the tube forwardly of said lens, each of said partitions having a light-reflecting surface on one side and a light-absorbing surface on the opposite side, said light reflecting surface comprising a smooth surface and said light absorbing surface comprising a plurality of horizontally extending flutes, the partitions being positioned so that the light-reflecting surfaces of the respective partitions face the same side of the tube, and light-absorbing areas disposed on the inner surface of the cylindrical tube extending throughout one half of the tube and to one side of the center partition.

WILLIAM RAMMINGER.

REFERENCES CITED

The following references are of record in the file of this patent:

UNITED STATES PATENTS

| Number | Name | Date |
|---|---|---|
| 1,141,718 | Martin | June 1, 1915 |
| 1,434,253 | Peabody | Oct. 31, 1922 |
| 1,493,426 | Bowman | May 6, 1924 |
| 1,517,393 | Bedford | Dec. 2, 1924 |
| 1,528,279 | Tolman | Mar. 3, 1925 |
| 1,587,434 | Smith | June 1, 1926 |
| 1,664,536 | Bement | Apr. 3, 1928 |